US012236387B2

(12) United States Patent
Durkee et al.

(10) Patent No.: US 12,236,387 B2
(45) Date of Patent: Feb. 25, 2025

(54) SYSTEMS AND METHODS FOR FULFILLING PRODUCT ORDERS

(71) Applicant: Walmart Apollo, LLC, Bentonville, AR (US)

(72) Inventors: Paul E. Durkee, Centerton, AR (US); Brian C. Roth, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 253 days.

(21) Appl. No.: 17/623,216

(22) PCT Filed: Jul. 1, 2020

(86) PCT No.: PCT/US2020/040405
§ 371 (c)(1),
(2) Date: Dec. 27, 2021

(87) PCT Pub. No.: WO2021/003208
PCT Pub. Date: Jan. 7, 2021

(65) Prior Publication Data
US 2022/0327602 A1 Oct. 13, 2022

Related U.S. Application Data

(60) Provisional application No. 62/869,213, filed on Jul. 1, 2019.

(51) Int. Cl.
*G06Q 10/0832* (2023.01)
*G06Q 10/087* (2023.01)
(52) U.S. Cl.
CPC ....... *G06Q 10/0832* (2013.01); *G06Q 10/087* (2013.01)

(58) Field of Classification Search
None
See application file for complete search history.

(56) References Cited

U.S. PATENT DOCUMENTS 4,634,333 A 1/1987 Butterly, Jr.
5,598,713 A 2/1997 Bartilucci
(Continued)

FOREIGN PATENT DOCUMENTS

BE 1015808 9/2005

OTHER PUBLICATIONS

PCT; App. No. US2020/040405; International Search Report and Written Opinion mailed Nov. 18, 2020.

*Primary Examiner* — Fateh M Obaid
(74) *Attorney, Agent, or Firm* — Fitch, Even, Tabin & Flannery, LLP

(57) ABSTRACT

In some embodiments, apparatuses and methods are provided herein useful to processing online orders. In some embodiments, a system for processing online order comprises an order processing server configured to receive an online order including grocery items and transmit, to a control circuit, the online order, the control circuit configured to receive the online order, determine the grocery items included in the online order, determine a number of grocery items that require refrigeration and a number of grocery items that require freezing, determine a number of totes required for the online order, assign to the online order the number of totes required, transmit, to the totes, a command, wherein each of the number of totes is configured to receive, from the control circuit, the command, and in response to the receipt of the command, one of maintain its temperature, enter the refrigeration state, and enter the freezer state.

16 Claims, 6 Drawing Sheets

(56) References Cited

U.S. PATENT DOCUMENTS

| | | | |
|---|---|---|---|
| 5,638,979 | A | 6/1997 | Shea |
| 6,409,066 | B1 | 6/2002 | Schneider |
| 6,433,313 | B1 | 8/2002 | Owens |
| 6,871,184 | B1 | 3/2005 | Liberman |
| 7,240,513 | B1 | 7/2007 | Conforti |
| 8,400,113 | B2 | 3/2013 | Waring |
| 8,504,413 | B1 | 8/2013 | Rowe |
| 9,333,649 | B1 | 5/2016 | Bradski |
| 10,482,421 | B1 * | 11/2019 | Ducrou ................ G06V 20/54 |
| 11,036,230 | B1 * | 6/2021 | Ebrahimi Afrouzi ....................... G05D 1/0212 |
| 11,340,079 | B1 * | 5/2022 | Ebrahimi Afrouzi ....................... G01C 21/188 |
| 2005/0029149 | A1 | 2/2005 | Leung |
| 2007/0221254 | A1 * | 9/2007 | Izumi ............... H01L 21/02041 134/94.1 |
| 2009/0201198 | A1 | 8/2009 | Moudy |
| 2015/0227882 | A1 | 8/2015 | Bhatt |
| 2019/0112119 | A1 | 4/2019 | Alexander |
| 2019/0210799 | A1 * | 7/2019 | Kropp .................... G07F 11/62 |
| 2019/0354815 | A1 * | 11/2019 | Yun ..................... G06V 10/776 |
| 2021/0094188 | A1 * | 4/2021 | Rodionov ............ B25J 11/0045 |

\* cited by examiner

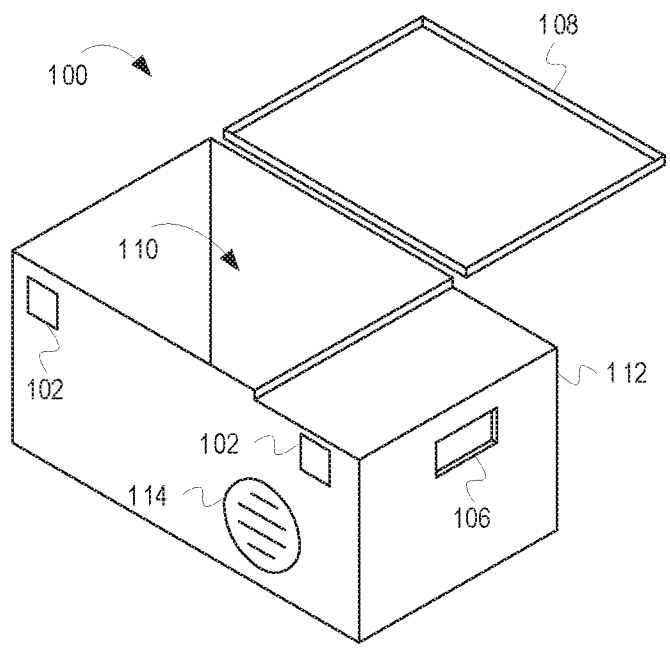
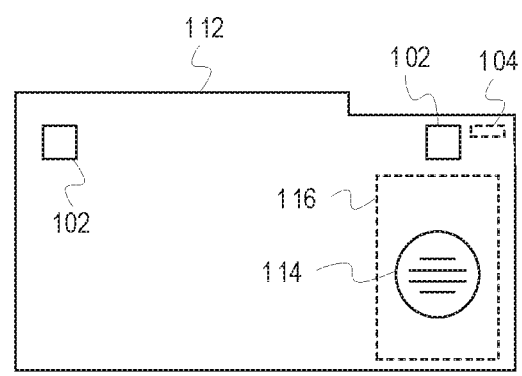
FIG. 1A
FIG. 1B
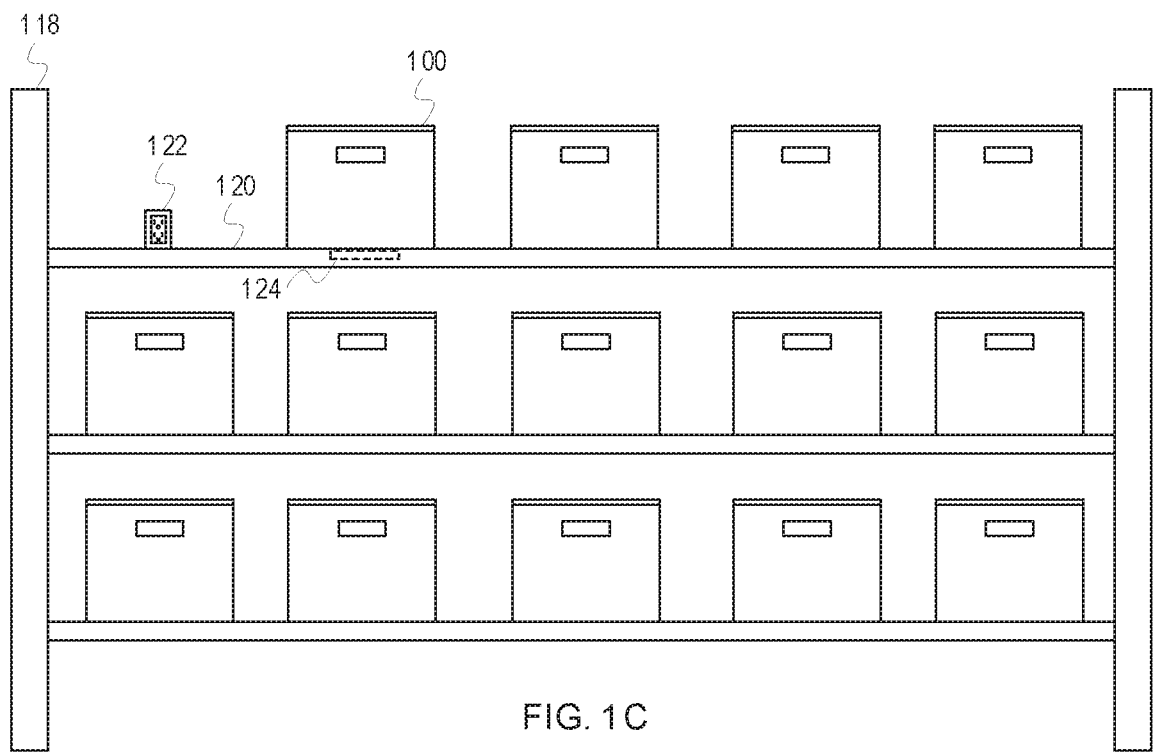
FIG. 1C

SYSTEMS AND METHODS FOR FULFILLING PRODUCT ORDERS

CROSS-REFERENCE TO RELATED APPLICATION

This application is a U.S. national phase application filed under 35 U.S.C. § 371 of International Application Number PCT/US2020/040405, filed Jul. 1, 2020, designating the United States, which claims the benefit of U.S. Provisional Application No. 62/869,213, filed Jul. 1, 2019, which is incorporated by reference in its entirety herein.

TECHNICAL FIELD

This invention relates generally to totes and, more specifically, totes for use with grocery items.

BACKGROUND

Due to the conveniences of online shopping, customers are looking for additional goods and services to purchase online. Currently, a handful of retailers allow customers to order groceries online. When an online grocery order is placed, employees of the retailer pick the grocery items for the customer. The customer then picks up the items or the items are delivered to the customer. When employees pick the items, the employees place the items into totes. Typically, these totes are plastic bins. While these plastic bins are useful for holding the items, they do not offer much of the way in condition controlling (e.g., temperature control). Consequently, there is a limited amount of time that grocery items, specifically those requiring refrigeration and/or freezing, can be left in the totes. This is problematic for both customer pickup and delivery. With regard to customer pick up, the grocery items cannot be picked too far in advance. With regard to delivery, the grocery items can remain in the totes for only so long limiting the distance that the grocery items can be delivered from the retailer. Consequently, a need exists for improved totes.

BRIEF DESCRIPTION OF THE DRAWINGS

Disclosed herein are embodiments of systems, apparatuses, and methods pertaining to processing online orders. This description includes drawings, wherein:

FIG. 1A is an isometric view of a tote 100, according to some embodiments;

FIG. 1B is a side elevational view of a tote 100, according to some embodiments;

FIG. 1C is a front elevational view of totes 100 disposed on a rack 118, according to some embodiments;

Figure 2:
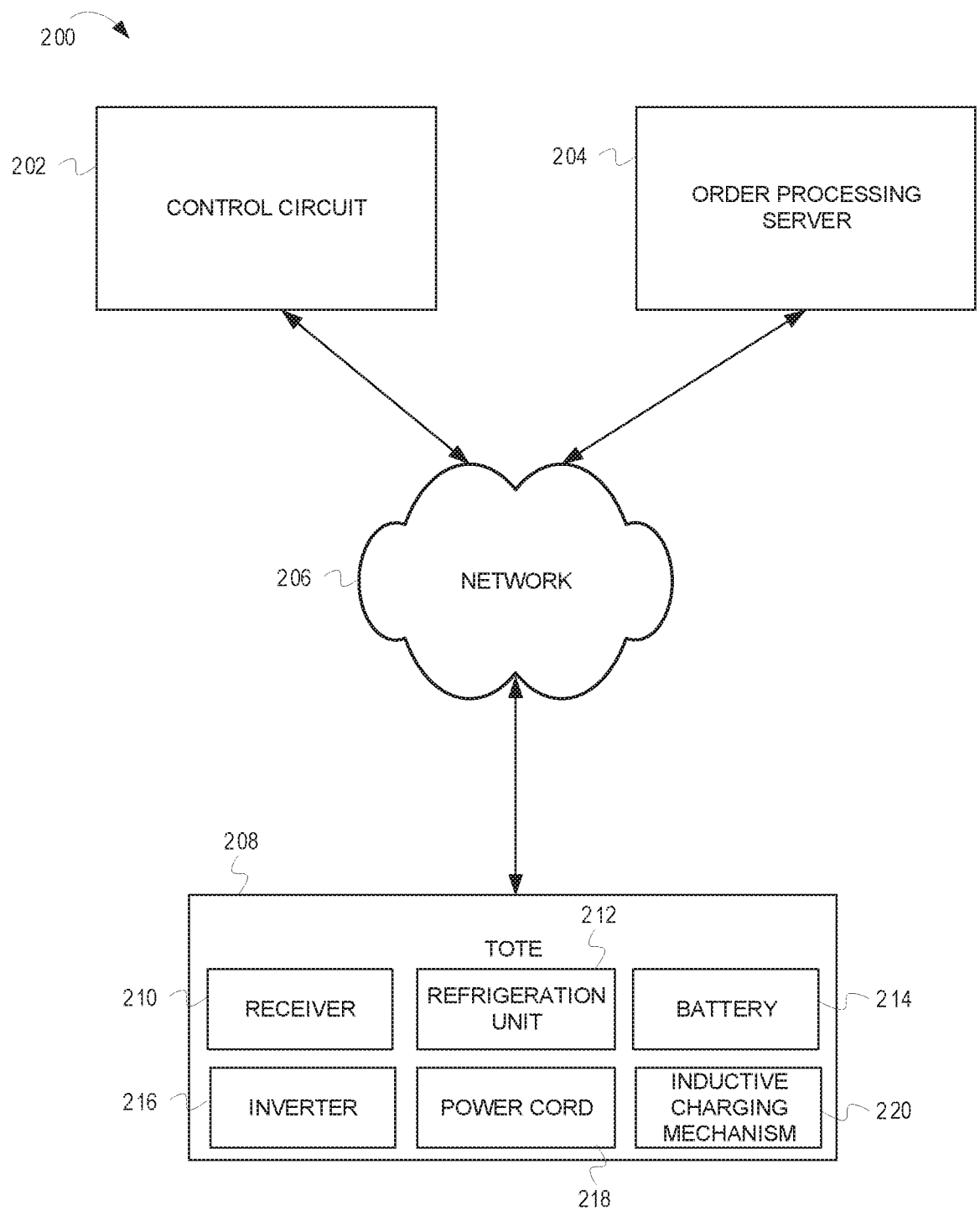
FIG. 2 is a block diagram of a system 200 for processing online orders, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to processing online orders. In some embodiments, a system for processing online order comprises an order processing server, wherein the order processing server is configured to receive, from a customer, an online order, wherein the online order includes grocery items and transmit, to a control circuit, the online order, the control circuit communicatively coupled to the order processing server and configured to receive, from the order processing server, the online order, determine, based on the online order, the grocery items included in the online order, determine, based on the grocery items included in the online order, a number of grocery items that require refrigeration and a number of grocery items that require freezing, determine, based on the number of grocery items requiring refrigeration and the number of grocery items requiring freezing, a number of totes required for the online order, assign to the online order, based on the number of grocery items requiring refrigeration and the number of grocery items requiring freezing, a number of totes required for the online order, transmit, to each of the number of totes, a command, wherein the command instructs each of the number of totes to one of maintain its temperature, enter a refrigeration state, an enter a freezer state, and the number of totes, wherein each of the number of totes is communicatively coupled to the control circuit, wherein each of the number of totes includes a refrigeration unit and a receiver, wherein each of the number of totes is configured to receive, from the control circuit via the receiver, the command, and in response to the receipt of the command, one of maintain its temperature, enter the refrigeration state, and enter the freezer state.

As previously discussed, customers have been turning to online grocery orders due to the convenience and time savings associated with foregoing a trip to a retailer to select and purchase grocery items. While online grocery ordering is convenient for customers, it presents problems for retailers. One specific problem is cold chain compliance. If an online grocery order includes items that require refrigeration and/or freezing, the retailer is only able to pick the items so far in advance. This poses logistical problems because only so many customers can be served within a specific time period (e.g., a window) with a given number of employees tasked with picking online grocery order items and/or delivering online grocery orders. One way to serve more customers in a given time period is to increase the number of employees tasked with picking online grocery order items and/or delivering online grocery orders. That is, the number of customers that can be served in a given time period is directly proportional to the number of employees tasked with picking online grocery items and/or delivering online grocery orders. To do so however, additional employees need to be hired or existing employees need to be shifted from other tasks. While hiring additional employees to pick items and/or deliver orders can increase the number of customers that can be served in a given time period, doing so is not inexpensive. Additionally, while shifting employees to online grocery order picking tasks can increase the number of customers that can be served in a given time period, doing so may leave other tasks uncompleted or portions of the retail facility understaffed. Described herein are systems, methods, and apparatuses that seek to reduce or eliminate this issue.

In some embodiments as described herein, condition-controlled totes—generally referred to as "refrigerated totes" or simply "totes"—are used to maintain cold chain compliance for longer periods of time than traditional plastic totes. Additionally, in some embodiments, a system can process online grocery orders to determine how many totes are needed for an order. The system assigns totes to the order. Additionally, the system can determine how many of those totes need to be refrigerated or frozen. The system sends commands to the totes to instruct the totes to enter a refrigerated or frozen state, or maintain their current state if acceptable. The discussion of FIGS. 1A-1C provides background information regarding such totes and the discussion of FIGS. 2-3 describe such systems for processing online grocery orders.

FIGS. 1A and 1B are isometric and side elevational views, respectively, of a tote 100, according to some embodiments. The tote 100 includes a main body 112. The main body 112 can be formed from any suitable material, such as metal, plastic, composite, etc. The main body 112 includes a container section 110. The container section 110 is condition-controlled (e.g., temperature-controlled, humidity-controlled, etc.) and is configured to house items, such as grocery items. The main body 112 and the container section 110 can be sized as needed. For example, in one embodiment, the main body 112 and the container section 110 can be sized to accommodate (i.e., the tote 100 is capable of holding) four one-gallon milk containers.

The main body 112 includes a lid 108. The lid 108 covers at least the container section 110 of the main body 112. In some embodiments, the lid 108 and/or the main body 112 can include seals (e.g., gaskets) that aid in condition control of the tote 100 (e.g., by creating a seal between the container section 110 and the lid 108). The main body 112 includes handles 106 and pickup points 102 for lifting the tote 100. The handles 106, as well as the pickup points 102, can be used my human and/or robotic operators. In some embodiments, the pickup points 102 are reinforced areas of the main body 112. For example, additional structure, such as cross-members, are incorporated within the main body 112 at the pickup points 102 to provide reinforcement for robotic lifting of the tote 100. Accordingly, the pickup points 102 may or may not be visible from the outside of the tote 100. For example, the main body 112 may include markings indicating the locations of pickup points 102, a convex or concave region to aid in lifting at the pickup points 102, a differing material or texture than the main body 112 at the pickup points 102, etc. Alternatively, the pickup points 102 may include no discernable features or markings.

The main body 112 houses a refrigeration unit 116. The refrigeration unit can be of any suitable type and utilize alternating current and/or direct current electricity for power. The refrigeration unit 116 controls the condition within the container section 110 (e.g., by refrigerating, freezing, or maintaining at any desired temperature, the container section 110). In some embodiments, the tote 100 includes a thermostat. The thermostat controls the refrigeration unit 116 to maintain the condition within the container section 110. Though the condition described herein is temperature, embodiments are not so limited, and any suitable condition can be maintained via use of the appropriate hardware. For example, if the condition to be controlled is humidity, the refrigeration unit 116 can be replaced with a humidifier. In some embodiments, the main body 112 includes a vent(s) 114 allowing airflow to the refrigeration unit 116.

In some embodiments, the tote 100 is capable of receiving, and/or transmitting, signals. In such embodiments, the tote 100 includes a receiver 104. Although generally referred to as a "receiver," the receiver 104 can also be a transceiver that is capable of transmitting signals as well as receiving signals or the tote 100 can include a separate transmitter (i.e., the term "receiver" encompasses both the receiver 104 and the transceiver). The signals can include commands. The commands can assign the tote 100 to a specific order and/or instruct the tote 100 to enter and/or maintain a condition-controlled state. For example, the command may instruct the tote 100 to enter a refrigerated state, enter a freezer state, or maintain its temperature. Such commands can be used to "precool" the container section 110 of the tote 100.

FIG. 1C depicts a rack 118 holding a number of totes 100. The rack 118 is configured to support the totes 100, for example, via shelves 120. The rack 118 can be located in a retail facility (e.g., a stockroom) or in a vehicle (e.g., a delivery vehicle). When located in a vehicle, the rack 118 can include securement devices to aid in securing the totes 100 to the rack 118. For example, the shelves 120 can include lips or edges within which the totes 100 seat, include structure that mates with the pickup points 102 and/or the handles 106 of the totes, etc.

In some embodiments, the rack 118 is also configured to provide electrical power to the totes 100. For example, the rack 118 can include 110 V or 220 V outlets 122 into which the totes 100 (i.e., the refrigeration unit 116) plug. Alternatively, the outlets 122 can provide DC power. If the refrigeration unit 116 is configured to accept DC power, the totes 100 can include inverters that convert the 110 V or 220 V power to DC. Additionally, in some embodiments, the totes 100 can include batteries and/or capacitors to store electrical power. Similarly, if the rack 118 is located in a vehicle, the outlets 122 can provide AC or DC power and the totes 100 can include inverters and/or batteries, if desired. Additionally, or alternatively, in some embodiments, the rack 118 can include wireless (i.e., inductive) charging pads 124. In such embodiments, the totes 100 include corresponding wireless (i.e., inductive) charging mechanisms.

While the discussion of FIGS. 1A-IC provides background information regarding totes, the discussion of FIG. 2 provides additional information regarding a system for processing online orders.

FIG. 2 is a block diagram of a system 200 for processing online orders, according to some embodiments. The system 200 includes a control circuit 202, an order processing server 204, a network 206 (i.e., a communications network), and a tote 208. The control circuit 202, order processing server 204, and tote 208 are communicatively coupled via the network 206. The network can be of any suitable type (e.g., based on the 802.11 standard (i.e., "Wi-Fi"), Bluetooth or other near field communication (NFC) standard, etc.) and include wired and/or wireless links. In one embodiment, the network 206 comprises both a local area network (LAN) and a wide area network (WAN), such as the Internet.

The order processing server 204 is configured to receive online orders from customers. The order processing server 204 can be a web server that hosts a website and/or receives online orders from customers via user devices, such as computers, smartphones, tablets, etc. With respect to the current discussion, the online orders include grocery items. It should be noted however that embodiments are not so limited. For example, the orders can include items in addition to grocery items as well as no grocery items. Additionally, the order need not include items for which condition control is needed. The order processing server 204 transmits the online orders to the control circuit 202 via the network 206.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 generally analyzes the online orders and manages the assignment of totes (such as the tote 208) to the online orders. When an online order is received, the control circuit 202 determines what items are included in the online order and assigns totes accordingly. For example, the control circuit 202 can determine a number of items included in the online order, size/dimensions of the items in the online order, and assign totes to the online order that will accommodate the items. The control circuit 202 can make these determination based on access to a database that includes product information. In one embodiment, the control circuit 202 determines how many totes are required for the online order and assigns that number of totes to the online order. The control circuit 202 can assign the totes in any suitable manner. For example, some of the totes may have different capabilities (e.g., be capable of maintaining different conditions), different sizes or capacities, different availabilities, etc. If all of the totes are uniform, the control circuit 202 can assign them based on a first in first out ("FIFO"), first in last out ("FILO"), random, rotating, etc. algorithm as desired.

If the online order includes grocery items (or other items that require specific conditions), the control circuit 202 can determine what conditions the grocery (or other items) require and assign totes accordingly. The control circuit 202 can determine what conditions are required of items via access to the database. In some embodiments, the control circuit can transmit commands to the totes. The commands can indicate the online order to which the tote is assigned and/or the condition that should be maintained by the totes. For example, if the online order includes refrigerated items and the tote 208 is assigned to the online order, the control circuit 202 can transmit a command to the tote 208 to enter a refrigeration state. If the tote 208 is already in the refrigeration state, the control circuit 202 can transmit a command to the tote 208 to maintain its state (i.e., maintain its temperature).

The tote 208 is one of a number of totes that can be assigned to online orders. The tote 208 is configured to accommodate items associated with online orders, as discussed with respect to FIGS. 1A-1B. The tote 208 can include any number of a receiver 210, a refrigeration unit 212, a battery 214, an inverter 216, a power cord 218 (e.g., a fixed or removable power cord 218), and an inductive charging mechanism 220. The receiver 210 can be any one or more of a receiver, a transmitter, and a transceiver. The receiver 210 is configured to receive signals (e.g., commands) from, and/or transmit signals to, the control circuit 202. The refrigeration unit 212 is configured to regulate the temperature within the tote 208. Although labeled as a "refrigeration unit," the refrigeration unit 212 of FIG. 2 can be replaced with any suitable type of unit based on the condition to be regulated within the tote 208. The battery 214, inverter 216, power cord 218, and inductive charging mechanism 220 are associated with providing power to the tote 208 (e.g., to the refrigeration unit 212). Though FIG. 2 depicts the tote 208 as including each of these components, embodiments are not so limited and the tote 208 of FIG. 2 is depicted as including each of these components for illustrative purposes.

Figure 3:
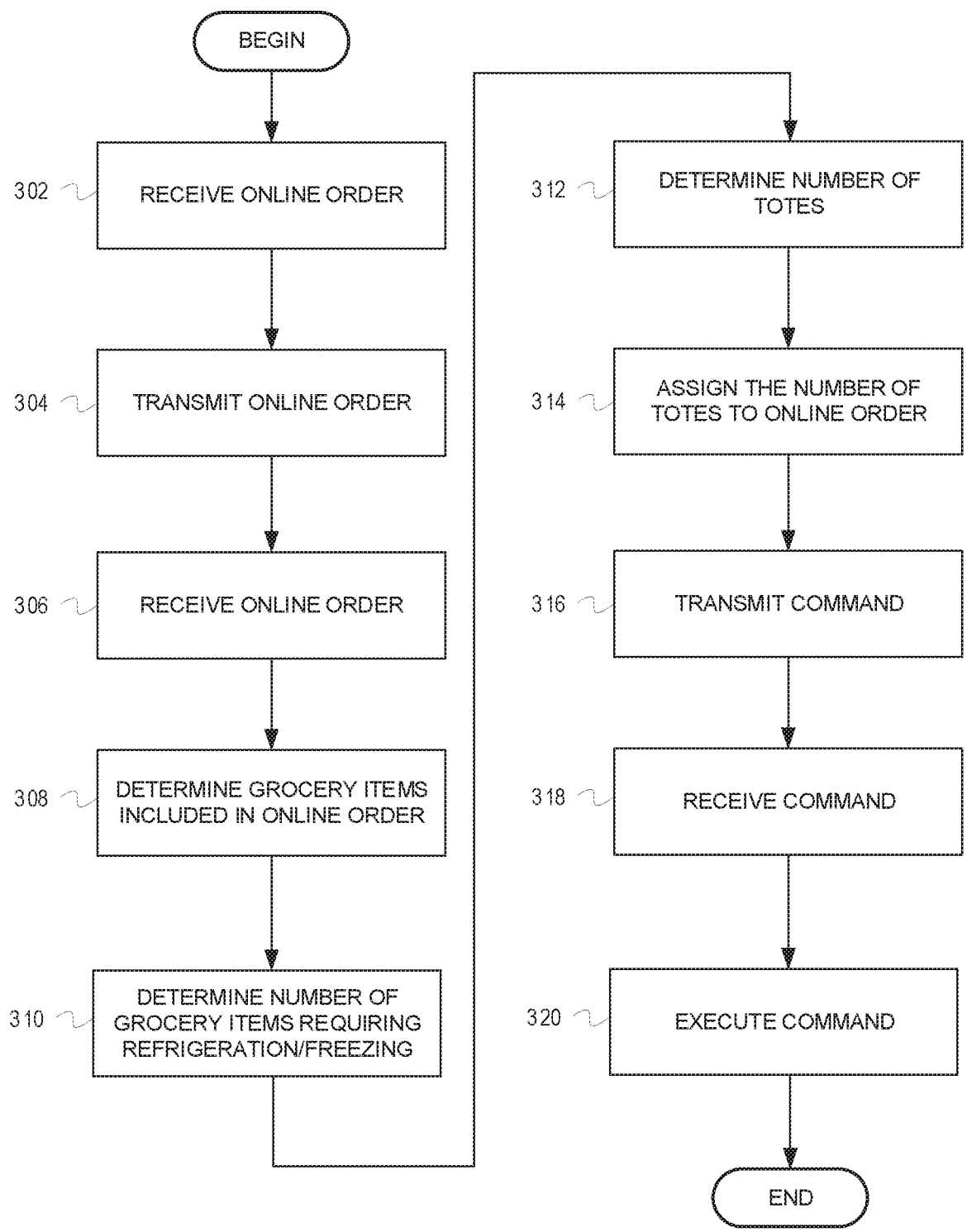
FIG. 3 is a flow chart including example operations for processing online orders, according to some embodiments.

While the discussion of FIG. 2 provides additional information regarding a system for processing online orders, the discussion of FIG. 3 provides example operations for processing online orders.

FIG. 3 is a flow chart including example operations for processing online orders, according to some embodiments. The flow begins at block 302.

At block 302, an online order is received. For example, the online order can be received at an order processing server. The order processing server can be associated with a single retail facility, a group of retail facilities, a single retailer, a group of retailers, or any combination of the aforementioned. The online order includes items, some of which may be items that require condition control, such as refrigerated or frozen grocery items. The flow continues at block 304.

At block 304, the online order is transmitted. For example, the order processing server can transmit the online order to a control circuit. The flow continues at block 306.

At block 306, the online order is received. For example, the online order can be received at the control circuit from the order processing server. The flow continues at block 308.

At block 308, the grocery items included in the order are determined. For example, the control circuit can determine the grocery items included in the online order. Though the examples provided herein refer to grocery items, embodiments are not so limited. For example, the control circuit can determine any and all items that require condition control. The control circuit can determine these items based on reference to a database. The database can be a product database that includes information relative to items, such as dimensions, weights, condition requirements, costs, availabilities, descriptions, etc. The flow continues at block 310.

At block 310, a number of grocery items requiring refrigeration and/or freezing is determined. For example, the control circuit can determine the number of grocery items included in the online order that require refrigeration and/or freezing. This determination can be made based on access to the database. Again, though the example described herein refer to grocery items that require refrigeration and/or freezing, embodiments are not so limited. That is, the control circuit can determine the number of items that require any type of condition control or require no condition control. The flow continues at block 312.

At block 312, a number of totes is determined. For example, the control circuit can determine a number of totes required for the online order. The control circuit makes this determination based on the number of items included in the online order, the number of grocery items included in the online order, the number of items requiring refrigeration included in the online order, the number of items requiring freezing included in the online order, the dimensions and/or weights of the items included in the online order, or any other suitable attribute of the items included in the online order and/or the tote(s). For example, the control circuit can determine the number of totes required for the online order in a manner which minimizes the total number of totes needed. The flow continues at block 314.

At block 314, the number of totes is assigned to the online order. For example, the control circuit can assign the number of totes to the online order. The control circuit can assign the number of totes to the online order in any suitable manner. For example, the control circuit can assign the totes in a manner that shuffles the totes used so that all totes are used regularly, assign the totes on a FIFO basis, etc. The flow continues at block 316.

At block 316, a command is transmitted. For example, the control circuit can transmit the command. The command can be transmitted to each of the number of totes or specific commands can be transmitted to each of the totes based, for example, on the items that are to be housed in each of the totes. The command instructs the tote(s) regarding the condition to be maintained by the tote(s). For example, if the tote is to house refrigerated items the command would instruct the tote to enter and/or maintain a refrigeration state, if the tote is to house frozen items the command would instruct the tote to enter and/or maintain a freezer state, if the tote is to house non-condition dependent items the command would instruct the tote to enter and/or maintain a room temperature state, etc. The flow continues at block 318.

At block 318, the command is received. For example, the tote(s) can receive the command. The tote(s) can receive the command via a receiver. The flow continues at block 320.

At block 320, the command is executed. For example, the tote(s) can execute the command. That is, the tote(s) can enter and/or maintain a refrigeration state, enter and/or maintain a freezer state, enter and/or maintain is temperature, etc.

Figure 4:
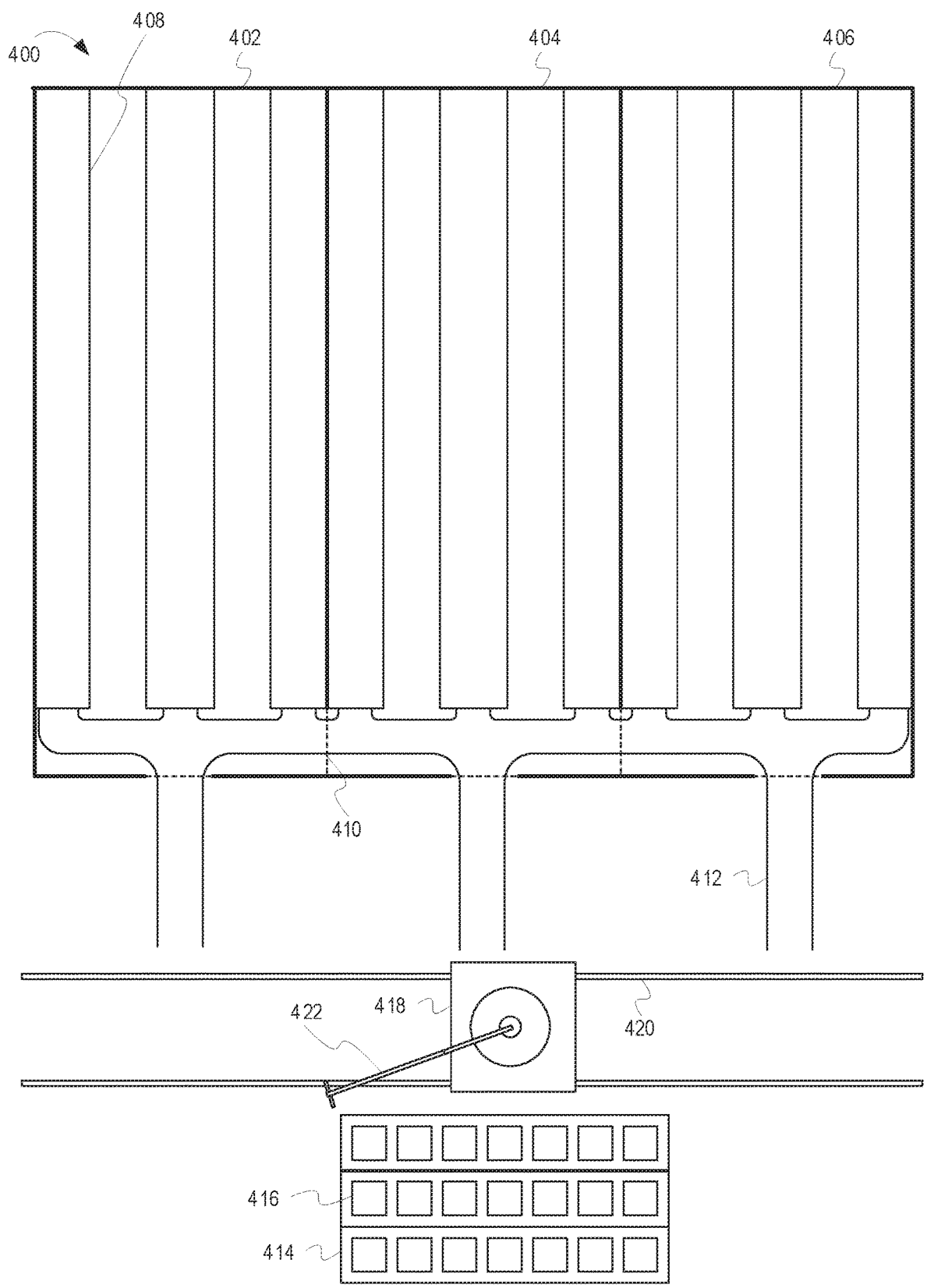
FIG. 4 depicts an external device (i.e., a robotic device 418) executing an instruction to transport totes 416 to an area 400, according to some embodiments.
Figure 5:
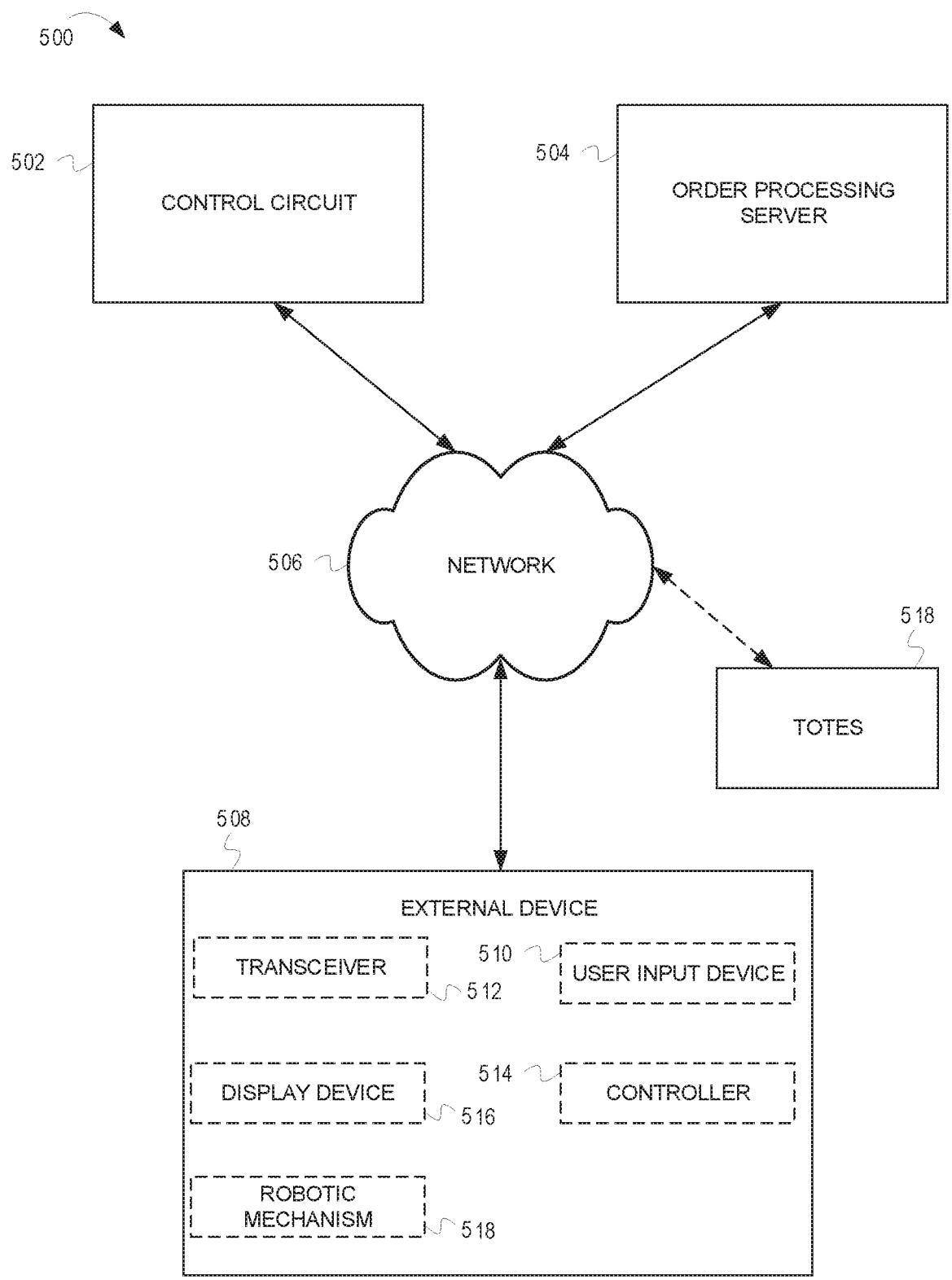
FIG. 5 is a block diagram of a system 500 for processing online orders, according to some embodiments.
Figure 6:
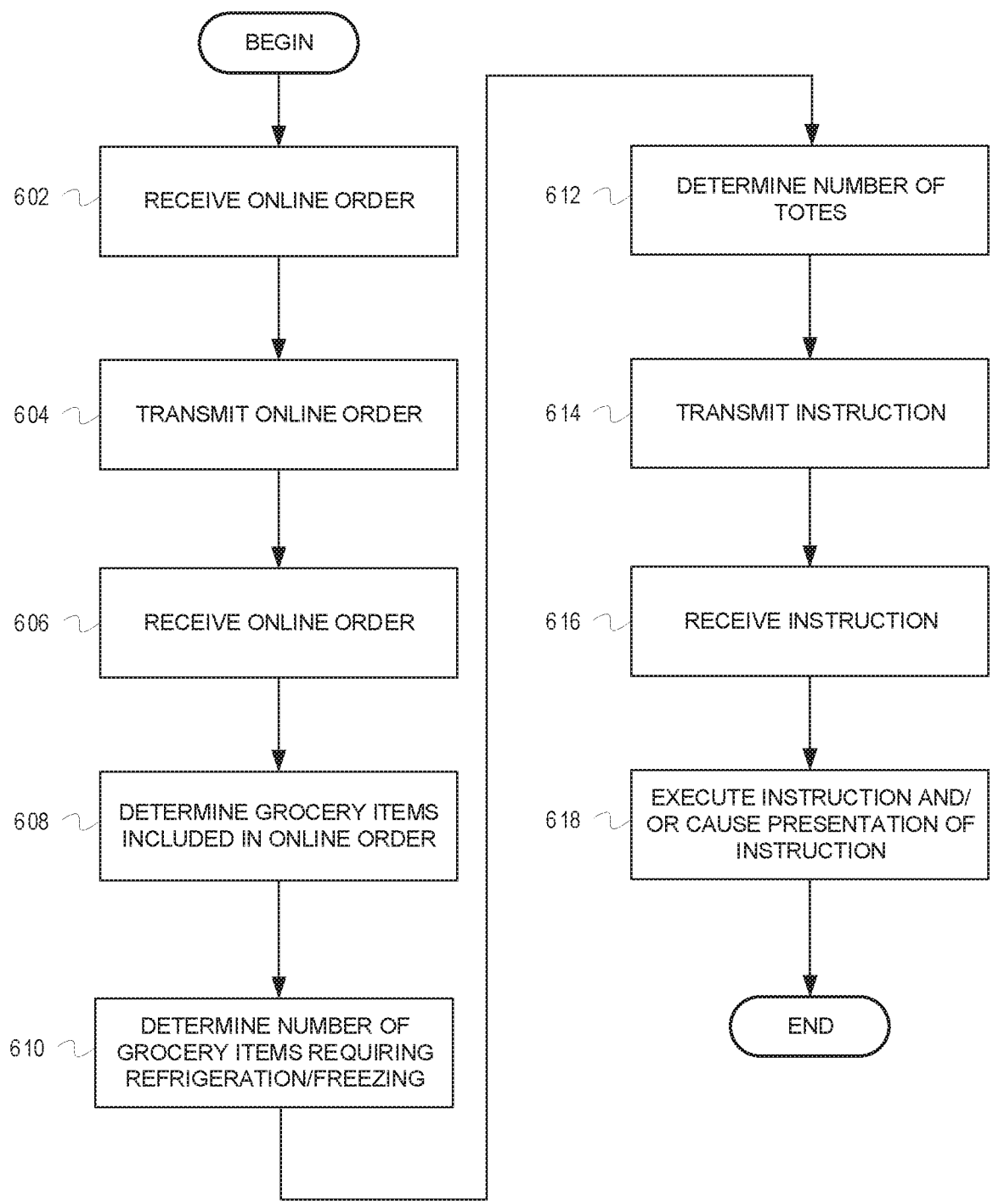
FIG. 6 is a flow chart including example operations for processing online orders, according to some embodiments.

While the discussion of FIGS. 1-3 describes processing online grocery orders using refrigerated totes, the discussion of FIGS. 4-6 describes processing online grocery orders using an external device. The concepts discussed in FIGS. 4-6 can be used with refrigerated totes as described previously and/or "passive totes." The term "passive totes" generally refers to totes that do not include condition control units (e.g., temperature-control, humidity control, etc. units). The discussion of FIG. 4 provides an overview of use of an external device in the processing of online orders, such as online grocery orders.

FIG. 4 depicts an external device (i.e., a robotic device 418) executing an instruction to transport totes 416 to an area 400, according to some embodiments. Though the external device depicted in FIG. 4 is a robotic device 418, embodiments are not so limited, as will be described in detail below. FIG. 4 is an overhead view of an area 400 of a facility. The facility may be a retail establishment (e.g., a grocery store or other retail facility) or warehouse facility (e.g., a distribution center, storage facility, etc.). In the case of a retail establishment, the area 400 may be located, for example, in a stockroom. The area 400 includes three condition-controlled sections: a first section 402, a second section 404, and a third section 406. Each of the sections can be maintained according to a specific condition. For example, the first section 402 can be a freezer section (e.g., a walk-in freezer or a large room cooled to an acceptable temperature for storing frozen items), the second section 404 can be a refrigerated section (e.g., a walk-in refrigerator or a large room cooled to an acceptable temperature for storing refrigerated items), and the third section 406 can be an ambient section (e.g., a room that is controlled with respect to temperature, light, humidity, etc. acceptable for storing items that need not be refrigerated and/or frozen). Though the example provided includes differing conditions for each of the three sections, embodiments are not so limited.

Each of the sections includes racks 408. The racks 408 are configured to store totes 416. The racks 408 can be configured to store condition-controlled and/or passive totes 416. Accordingly, the racks 408 can include features such as those described with respect to FIG. 1C and/or be simple shelving structures (e.g., metal, plastic, and/or wood shelves capable of supporting totes). In one embodiment, the racks 408 are part of a larger mechanism that is capable of moving totes in any of three dimensions by way of conveyors, elevators, etc.

In one embodiment, as depicted in FIG. 4, the establishment in which the area 400 is located (as well as the area 400) can include conveyor mechanisms 412. In such embodiments, the area 400, as well as the sections, can include passageways 410 through which the conveyor mechanisms 412 pass. The conveyor mechanisms 412 transport the totes 416 to different sections within the area 400.

As discussed previously, the external device depicted in FIG. 4 is a robotic device 418. The robotic device 418 depicted in FIG. 4 includes a robotic arm 422 mounted on a base. The base is capable of moving along tracks 420. The robotic device 418 selects the totes 416 from the storage units 414. The robotic device 418 selects the totes 416 from the storage units 414 based on instruction received. The instruction indicates the number of totes 416 required for the online order and states for one or more of the totes (e.g., intended states). The robotic device 418 executes the instruction by transporting the totes 416 to areas that are consistent with the states for the totes 416. In the example depicted in FIG. 4, the robotic device 418 transports the totes 416 via the conveyor mechanisms 412 by placing each of the totes 416 on the appropriate section of the conveyor mechanisms 412. For example, if a tote 416 is to be placed in the first section 402 of the area 400, the robotic device 418 can retrieve the totes 416 from the storage unit 414 and place it on the leftmost section of the conveyor mechanisms 412.

While the robotic device 418 depicted in FIG. 4 includes a robotic arm 422 in conjunction with conveyor mechanisms 412, embodiments are not so limited. That is, the robotic device 418 can be of any suitable type and therefore include any suitable robotic mechanism. For example, the robotic device 418 can be and/or include a robotic arm 422, a shuttle, a conveyor system, an automated mobile robot (AMR) system, a drone system, and/or a locker system.

Additionally, though the external device is depicted as the robotic device 418 in FIG. 4, the external device need not be a device that is capable of transporting the totes 416. For example, in some embodiments, the external device is a user device (e.g., a computer, smartphone, tablet, personal digital assistant (PDA), dedicated device, etc.). In one embodiment, the external device is a user device, such as a device carried by an employee of the establishment to aid in fulfilling orders. In such embodiments, the user device can present the instruction to an employee and the employee can transport the totes 416 to the area 400 as called for by the instruction. For example, the user device can present a message to an employee instructing the employee to move a specified number of totes 416 to one or more of the first section 402, the second section 404, and the third section 406. The employee can transport the totes 416 manually or with the aid of robotic equipment. As with the condition-controlled totes discussed with respect to FIGS. 1-3, the passive totes can be uniquely identifiable (e.g., by serial number). In such embodiments, the instruction can indicate that specific ones of the totes should be moved to the specific areas.

While the discussion of FIG. 4 provides an overview of processing online grocery orders using an external device, the discussion of FIG. 5 provides additional detail regarding a system for processing online grocery orders using an external device.

FIG. 5 is a block diagram of a system 500 for processing online orders, according to some embodiments. The system 500 includes a control circuit 502, an order processing server 504, a network 506 (i.e., a communications network), and an external device 508. The control circuit 502, order processing server 504, and external device 508 are communicatively coupled via the network 506. The network can be of any suitable type (e.g., based on the 802.11 standard (i.e., "Wi-Fi"), Bluetooth or other near field communication (NFC) standard, etc.) and include wired and/or wireless links. In one embodiment, the network 506 comprises both a local area network (LAN) and a wide area network (WAN), such as the Internet.

The order processing server 504 is configured to receive online orders from customers. The order processing server 504 can be a web server that hosts a website and/or receives online orders from customers via user devices, such as computers, smartphones, tablets, etc. With respect to the current discussion, the online orders include grocery items. It should be noted however that embodiments are not so limited. For example, the orders can include items in addition to grocery items as well as no grocery items. Additionally, the order need not include items for which condition control is needed. The order processing server 504 transmits the online orders to the control circuit 502 via the network 506.

The control circuit 502 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 502 is configured (for example, by using corresponding programming as will be well understood by those skilled in the art) to carry out one or more of the steps, actions, and/or functions described herein.

By one optional approach the control circuit 502 operably couples to a memory. The memory may be integral to the control circuit 502 or can be physically discrete (in whole or in part) from the control circuit 502 as desired. This memory can also be local with respect to the control circuit 502 (where, for example, both share a common circuit board, chassis, power supply, and/or housing) or can be partially or wholly remote with respect to the control circuit 502 (where, for example, the memory is physically located in another facility, metropolitan area, or even country as compared to the control circuit 502).

This memory can serve, for example, to non-transitorily store the computer instructions that, when executed by the control circuit 502, cause the control circuit 502 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 502 generally analyzes the online orders to determine how many totes 518 are required for the online orders. For example, the control circuit 502 can determine a number of items included in the online order, size/dimension of the items in the online order, and how many totes 518 are to be used to accommodate the items. The control circuit 502 can make these determinations based on access to a database that includes product information. In one embodiment, the control circuit 502 determines how many totes 518 are required for the online order and assigns that number of totes 518 to the online order. The control circuit 502 can assign the totes in any suitable manner. For example, in embodiments in which condition-controlled totes 518 are utilized, some of the totes 518 may have different capabilities (e.g., be capable of maintaining different conditions), different sizes or capacities, different availabilities, etc. If all of the totes 518 are uniform, the control circuit 502 can assign them based on a first in first out ("FIFO"), first in last out ("FILO"), random, rotating, etc. algorithm as desired.

If the online order includes grocery items (or other items that require specific conditions), the control circuit 502 can determine what conditions the grocery (or other items) require and determine a number of totes accordingly. The control circuit 502 can determine what conditions are required of items via access to the database. The control circuit 502 then determines how many totes 518 for each state are needed. The control circuit 502 transmits an instruction to the external device 508. The instruction indicates the number of totes 518 and states for one or more of the totes 518.

The external device 508 receives the instruction from the control circuit 502. The manner in which the external device 508 executes the instruction may depend upon the type of the external device 508. As previously discussed, the external device 508 can be of any suitable type and can take many forms. In one embodiment, the external device 508 is a robotic device (e.g., a robotic arm, a shuttle, a conveyor system, an AMR system, a drone system, a locker system, etc.). In such embodiments, the external device 508 executes the instruction by transporting (i.e., physically transporting and/or causing physical transport by one or more other devices) the totes 518. In another embodiment, the external device 508 is a user device (e.g., a computer, smartphone, tablet, personal digital assistant (PDA), dedicated device, etc.). The user device can be carried by an employee and the employee facilitates transport of the totes 518. In such embodiments, the external device 508 executes the instruction by presenting the instruction (e.g., a message indicating the content of the instruction) via a display device 516. In a third embodiment, the external device 508 is a delivery vehicle. The delivery vehicle can include one or more compartments that are capable of maintaining a condition. For example, the delivery vehicle can be a vehicle that is configured to deliver grocery orders to customers. In such embodiments, the external device 508 executes the instruction by causing one or more compartments within the external device 508 (i.e., the delivery vehicle) to enter one or more states. Though referred to above as separate embodiments dependent upon the type of the external device 508, it should be noted that, in some embodiments, multiple types of external device 508 can be used in concert. As but one example, the external device 508 can include a robotic device and a delivery vehicle. In such embodiments, the control circuit 502 can transmit the instruction to both the robotic device and the delivery vehicle. The robotic device can execute the instruction by transporting the totes 518 to the delivery vehicle and/or compartments within the delivery vehicle. The delivery vehicle can execute the instruction by causing the compartments within the delivery vehicle to enter specified states.

Because the external device 508 can take a number of forms, the external device 508 in FIG. 5 is depicted having a number of optional components, as indicated by the dashed lines for some of the components depicted in FIG. 5. As depicted in FIG. 5, the external device 508 can include one or more of a user input device 510, a transceiver 512, a controller 514, a display device 516, and a robotic mechanism 518 (e.g., a robotic arm, locomotion system (e.g., wheels, motor, power supply, etc.), hook, conveyor systems, locker components, etc.). Though each of these components is depicted in FIG. 5, the external device need not include each of these components in every embodiment. Additionally, the external device 508 can include components in addition to, or in lieu of, those depicted in FIG. 5. The user input device 510 can be of any suitable type (e.g., a mouse, keyboard, joystick, touchscreen, buttons, etc.) and allows a user to provide input to the external device 508. For example, the user input device 510 can allow the user to provide input indicating that the instruction has been completed. The transceiver 512 can receive, and transmit, information from, and to, other devices in the system 500. For example, the transceiver 512 can receive the instruction from the control circuit 502 and transmit confirmation messages (e.g., indicating that the instruction has been executed) to the control circuit 502. The controller 514 can be any suitable type of hardware and/or software component that is capable of controlling the external device 508. For example, the controller 514 can include a central processing unit (CPU) that is capable of executing commands to cause the external device 508 to perform actions. The display device can be of any suitable type (e.g., a "screen" such as a touchscreen or LED display, indicator lights, etc.). For example, the in case of a user device, the display device 516 can be a display that presents information, such as the instruction, to a user.

As previously discussed, the totes 518 depicted in FIG. 5 can be condition-controlled and/or passive. In embodiments in which at least some of the totes 518 are condition-controlled, the totes 518 can be communicatively coupled to the network 506, as described in more detail with respect to FIG. 2 and as indicated by the dashed line in FIG. 5. In the case of passive totes 518, the totes 518 may not be communicatively coupled to the network 506. The passive totes can take any suitable form and can be constructed from any suitable material. In some embodiments, the totes 518, whether condition-controlled or passive, can include insulation and/or temperature control mediums (e.g., eutectic plates, ice, etc.).

While the discussion of FIG. 5 provides additional detail regarding a system for processing online grocery orders using an external device, the discussion of FIG. 6 describes example operations of such a system.

FIG. 6 is a flow chart including example operations for processing online orders, according to some embodiments. The flow begins at block 602.

At block 602, an online order is received. For example, the online order can be received at an order processing server. The order processing server can be associated with a single retail facility, a group of retail facilities, a single retailer, a group of retailers, or any combination of the aforementioned. The online order includes items, some of which may be items that require condition control, such as refrigerated or frozen grocery items. The flow continues at block 604.

At block 604, the online order is transmitted. For example, the order processing server can transmit the online order to a control circuit. The flow continues at block 606.

At block 606, the online order is received. For example, the online order can be received at the control circuit from the order processing server. The flow continues at block 608.

At block 608, the grocery items included in the order are determined. For example, the control circuit can determine the grocery items included in the online order. Though the examples provided herein refer to grocery items, embodiments are not so limited. For example, the control circuit can determine any and all items that require condition control. The control circuit can determine these items based on reference to a database. The database can be a product database that includes information relative to items, such as dimensions, weights, condition requirements, costs, availabilities, descriptions, etc. The flow continues at block 610.

At block 610, a number of grocery items requiring refrigeration and/or freezing is determined. For example, the control circuit can determine the number of grocery items included in the online order that require refrigeration and/or freezing. This determination can be made based on access to the database. Again, though the examples described herein refer to grocery items that require refrigeration and/or freezing, embodiments are not so limited. That is, the control circuit can determine the number of items that require any type of condition control or require no condition control. The flow continues at block 612.

At block 312, a number of totes is determined. For example, the control circuit can determine the number of totes required for the online order. The control circuit makes this determination based on the number of items included in the online order, the number of grocery items included in the online order, the number of items requiring refrigeration included in the online order, the number of items requiring freezing included in the online order, the dimensions and/or weights of the items included in the online order, or any other suitable attribute of the items included in the online order and/or the tote(s). For example, the control circuit can determine the number of totes required for the online order in a manner which minimizes the total number of totes needed. The flow continues at block 614.

At block 614, an instruction is transmitted. For example, the control circuit can transmit the command to an external device. The instruction indicates the number of totes required for the online order. Additionally, in some embodiments, the instruction indicates an intended state for at least one of the totes for the online order. As discussed previously, the intended state can be of any suitable type. As but one example, the intended state relates to a temperature of the tote (e.g., an ambient state, a refrigeration state, and a freezer state). The flow continues at block 616.

At block 616, the instruction is received. For example, the external device can receive the instruction from the control circuit. The flow continues at block 618.

At block 618, the instruction is executed. For example, the external device can execute the instruction. In embodiments in which the external device is a robotic device, the external device can execute the instruction by transporting the totes to an area that is consistent with the state for the totes. Additionally, in some embodiments, the robotic device can present an indication of the instruction. In embodiments in which the external device is a user device, the user device can execute the instruction by presenting the instruction (e.g., a message or notification indicating the instruction) via a display device. In embodiments in which the external device is a delivery vehicle, the external device can execute the instruction by causing compartment(s) within the delivery vehicle to enter a specified state.

In some embodiments, a system for processing online order comprises an order processing server, wherein the order processing server is configured to receive, from a customer, an online order, wherein the online order includes grocery items and transmit, to a control circuit, the online order, the control circuit communicatively coupled to the order processing server and configured to receive, from the order processing server, the online order, determine, based on the online order, the grocery items included in the online order, determine, based on the grocery items included in the online order, a number of grocery items that require refrigeration and a number of grocery items that require freezing, determine, based on the number of grocery items requiring refrigeration and the number of grocery items requiring freezing, a number of totes required for the online order, assign to the online order, based on the number of grocery items requiring refrigeration and the number of grocery items requiring freezing, a number of totes required for the online order, transmit, to each of the number of totes, a command, wherein the command instructs each of the number of totes to one of maintain its temperature, enter a refrigeration state, an enter a freezer state, and the number of totes, wherein each of the number of totes is communicatively coupled to the control circuit, wherein each of the number of totes includes a refrigeration unit and a receiver, wherein each of the number of totes is configured to receive, from the control circuit via the receiver, the command, and in response to the receipt of the command, one of maintain its temperature, enter the refrigeration state, and enter the freezer state.

In some embodiments, an apparatus and a corresponding method performed by the apparatus comprises receiving, from a customer at an order processing server, an online order, wherein the online order includes grocery items, transmitting, by the order processing server to a control circuit via a communications network, the online order, receiving, by the control circuit from the order processing server, the online order, determining, by the control circuit based on the grocery items included in the online order, a number of the grocery items that require refrigeration and a number of the grocery items that require freezing, determining, by the control circuit based on the number of grocery items requiring refrigeration and the number of grocery items requiring freezing, a number of totes required for the online order, assigning, by the control circuit to the online order based on the number of grocery items requiring refrigeration and the number of grocery items requiring freezing, the number of totes from a plurality of totes, transmitting, by the control circuit to each of the number of totes, a command, wherein the command instructs each of the number of totes to one of maintain its temperature, enter a refrigeration state, and enter a freezer state, receiving, by each of the number of totes from the control circuit, the command, and in response to receipt of the command, each of the number of totes one of maintaining their temperature, entering the refrigeration state, and entering the freezer state.

In some embodiments, a system for processing online orders comprises an order processing server, wherein the order processing server is configured to receive, from a customer, an online order, wherein the online order includes grocery items, and transmit, to a control circuit via a communications network, the online order, the control circuit communicatively coupled to the order processing server, the control circuit configured to receive, from the order processing server via the communications network, the online order, determine, based on the online order, the grocery items included in the online order, determine, based on the grocery items included in the online order, a number of the grocery items that require refrigeration and a number of grocery items that require freezing, determine, based on the number of grocery items requiring refrigeration and the number of grocery items requiring freezing, a number of totes required to the online order, transmit, to an external device, an instruction, wherein the instruction indicates the number of totes required for the online order and indicates an intended state for at least one of the totes, wherein the intended state is one of an ambient state, a refrigeration state, and a freezer state, the external device, wherein the external device is configured to receive, from the control circuit via the communications network, the instruction, and execute the instruction.

In some embodiments, an apparatus and a corresponding method performed by the apparatus comprises receiving, from a customer at an order processing server, an online order, wherein the online order includes grocery items, transmitting, by the order processing server to a control circuit via a communications network, the online order, receiving, by the control circuit from the order processing server, the online order, determining, by the control circuit based on the online order, the grocery items included in the online order, determining, by the control circuit based on the grocery items included in the online order, a number of the grocery items that require refrigeration and a number of the grocery items that require freezing, determining, by the control circuit based on the number of grocery items requiring refrigeration and the number of grocery items requiring freezing, a number of totes required for the online order, transmitting, by the control circuit to an external device, an instruction, wherein the instruction indicates the number of totes required for the online order and indicates an intended state for at least one tote of the number of totes, wherein the intended state is one of an ambient state, a refrigeration state, and a freezer state, receiving, from the control circuit by the external device, the instruction, and executing by the external device, the instruction.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for processing online orders, the system comprising:
    a robotic device at a facility;
    an order processing server, wherein the order processing server is configured to:
       receive, from a customer, an online order, wherein the online order includes grocery items; and
       transmit, to a control circuit via a communications network, the online order;
    the control circuit communicatively coupled to the order processing server, the control circuit configured to:
       receive, from the order processing server via the communications network, the online order;
       determine, based on the online order, the grocery items included in the online order;
       determine, based on the grocery items included in the online order, a number of the grocery items that require refrigeration and a number of the grocery items that require freezing;
       determine, based on the number of grocery items requiring refrigeration and the number of grocery items requiring freezing, a number of totes required for the online order;
       transmit, to the robotic device, an instruction, wherein the instruction indicates the number of totes required for the online order and indicates an intended state for at least one tote of the number of totes, wherein the intended state is one of a refrigeration state and a freezer state;
    wherein the robotic device transports, or causes transport of, the at least one tote of the number of totes to a refrigerated section of a storage area of the facility if the intended state is a refrigeration state or to a freezer section of the storage area if the intended state is a freezer state.

2. The system of claim 1, wherein the control circuit is further configured to:
    assign to the online order, based on the number of grocery items requiring refrigeration and the number of grocery items requiring freezing, the number of totes from a plurality of totes.

3. The system of claim 1, wherein the storage area comprises a first section, a second section, and a third section, wherein the first section is the refrigerated section, the second section is the freezer section, and the third section is an ambient section.

4. The system of claim 1, wherein the robotic device is one or more of a robotic arm, a shuttle, a conveyor system, an automated mobile robot (AMR) system, a drone system, and a locker system.

5. The system of claim 1, wherein the at least one tote is one or more of insulated and equipped with temperature control mediums.

6. A method for processing online orders, the method comprising:
    receiving, from a customer at an order processing server, an online order, wherein the online order includes grocery items;
    transmitting, by the order processing server to a control circuit via a communications network, the online order;
    receiving, by the control circuit from the order processing server, the online order;
    determining, by the control circuit based on the online order, the grocery items included in the online order;
    determining, by the control circuit based on the grocery items included in the online order, a number of the grocery items that require refrigeration and a number of the grocery items that require freezing;
    determining, by the control circuit based on the number of grocery items requiring refrigeration and the number of grocery items requiring freezing, a number of totes required for the online order;
    transmitting, by the control circuit to a robotic device at a facility, an instruction, wherein the instruction indicates the number of totes required for the online order and indicates an intended state for at least one tote of the number of totes, wherein the intended state is one of a refrigeration state and a freezer state; and
    by the robotic device, transporting, or causing transport of, the at least one tote of the number of totes to a refrigerated section of a storage area of the facility if the intended state is a refrigeration state or to a freezer section of the storage area if the intended state is a freezer state.

7. The method of claim 6, further comprising:
    assigning, by the control circuit to the online order based on the number of grocery items requiring refrigeration and the number of grocery items requiring freezing, the number of totes from a plurality of totes.

8. The method of claim 6, wherein the storage area comprises a first section, a second section, and a third section, wherein the first section is the refrigerated section, the second section is the freezer section, and the third section is an ambient section.

9. The method of claim 6, wherein the robotic device is one or more of a robotic arm, a shuttle, a conveyor system, an automated mobile robot (AMR) system, a drone system, and a locker system.

10. The method of claim 6, further comprising:
    transmitting, by the robotic device to the control circuit via the communications network upon execution of the instruction, a confirmation message, wherein the confirmation message indicates that the instruction has been executed.

11. The method of claim 6, wherein the at least one tote is one or more of insulated and equipped with temperature control mediums.

12. The system of claim 1, wherein the at least one tote of the number of totes comprises a first set of totes and a second set of totes, wherein the intended state is a refrigeration state for the first set of totes and a freezer state for the second set of totes.

13. The system of claim 1, further comprising one or more conveyor mechanisms transporting a first set of totes to the refrigerated section in the storage area and transporting a second set of totes to the freezer section in the storage area.

14. The system of claim 13, wherein the robotic device comprises a robotic arm that cooperates with the one or more conveyor mechanisms to direct the first set of totes to the refrigerated section and to direct the second set of totes to the freezer section.

15. The method of claim 6, further comprising, by one or more conveyor mechanisms, transporting a first set of totes to the refrigerated section in the storage area and transporting a second set of totes to the freezer section in the storage area.

16. The method of claim 15, wherein the robotic device comprises a robotic arm, the method further comprising:
   by the robotic arm cooperating with the one or more conveyor mechanisms, directing the first set of totes to the refrigerated section and directing the second set of totes to the freezer section.

\* \* \* \* \*